June 5, 1923.
W. JOHNSEN
CUTTING SHEARS
Filed Sept. 28, 1921
1,457,527
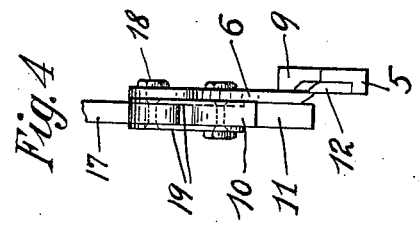
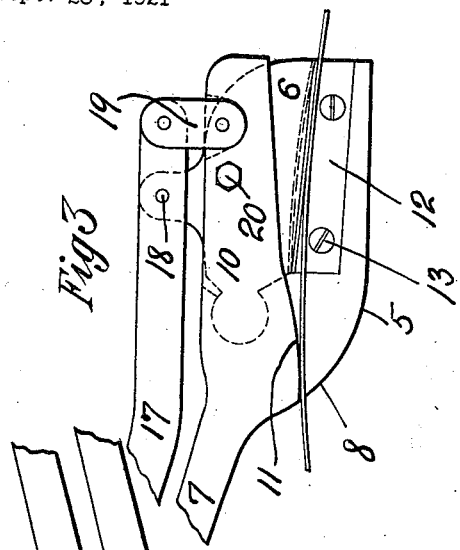
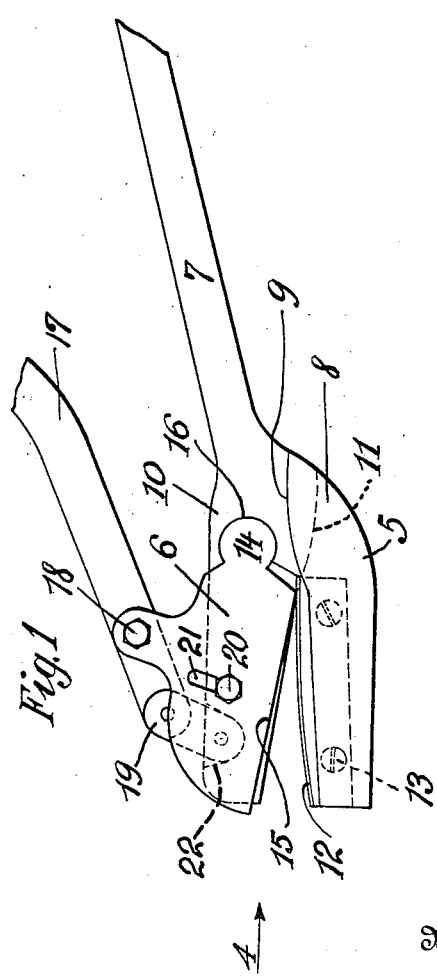
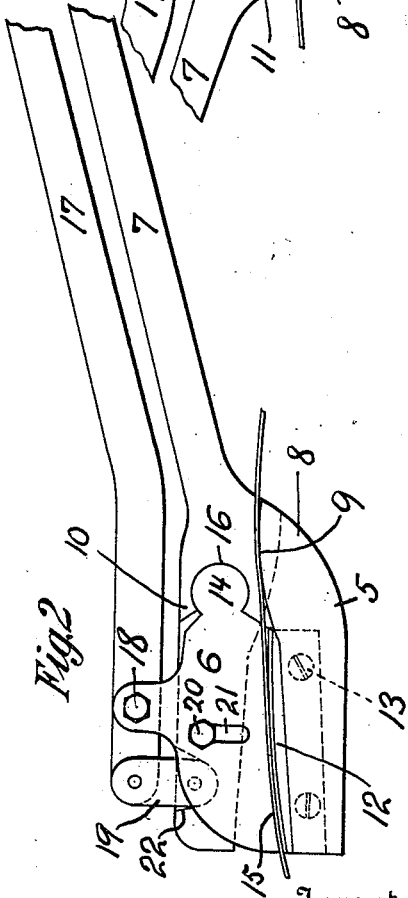
Wilhelm Johnsen Inventor
By his Attorney
Ivan E. A. Konigsberg Patented June 5, 1923.

1,457,527

UNITED STATES PATENT OFFICE.

WILHELM JOHNSEN, OF NEW BRIGHTON, NEW YORK, ASSIGNOR TO JOHN PETTERSON, OF BROOKLYN, NEW YORK.

CUTTING SHEARS.

Application filed September 28, 1921. Serial No. 503,781.

*To all whom it may concern:*

Be it known that I, WILHELM JOHNSEN, a citizen of Norway, resident of New Brighton, in the county of Richmond and State of New York, have invented certain new and useful Improvements in Cutting Shears, of which the following is a specification.

This invention relates to sheet metal shears. The object of the invention is to provide a generally improved pair of shears for cutting sheet metal and similar heavy material. One object of the invention is to provide a pair of shears so arranged that the manipulating of the shears may be done above the sheet to be cut. Another object is to provide the shears with certain guiding surfaces for supporting the material while it is being cut. Other objects will appear as this specification proceeds. In the accompanying drawing illustrating the invention Fig. 1 is a side view of the shears showing the same in open position and with the handles broken away.

Fig. 2 is a similar view showing the shears closed.

Figure 3 is a view similar to Figure 2 but showing the opposite side of the shears.

Fig. 4 is an end view looking in the direction of arrow 4 in Figure 1.

The shears consist of two main members. One member, generally denoted by the reference numeral 5, may appropriately be termed the stationary member. The other member 6 may be termed the movable member. These terms are of course entirely illustrative and for the purposes of identification. The member 5 is integral with the one handle 7 and forms a base portion 8 provided with a sheet guide surface or cam 9. Integral with said member 5 but offset from the base 8 is a portion 10 forming a backing or support for the movable member 6. Said backing member or portion 10 is provided with an undercut sheet guide 11. The member 5 is provided with a relatively stationary cutting blade 12 removably secured by screws 13.

On the member 5 there is pivoted as at 14 the movable member 6 having a cutting edge 15. The member 6 will therefore hereinafter and in the claims be called a cutting blade. The blade has a pivot 14 seated in a socket 16 in the backing 10 and flush therewith. The blade 6 is operated to cut with its edge 15 cooperating with the stationary blade 12 by means of a handle 17 pivoted to the blade at 18. The handle is movably supported on the base 5 by a double link 19 connecting the handle and the base. The blade 6 is guided and retained in position on the base 5 by a bolt 20 and slot 21. The backing 10 is cut out as at 22 to provide space for the link 19.

When the shears are open as in Figure 1, ample space is provided between the cutting blades 6 and 12 for obtaining a good grip on the sheet to be cut and for accurately following the markings on the sheet. A heavy sheet is easily cut due to the compound leverage provided by the mounting of the handle 17.

When a cut has been made and the shears are advanced into the sheet, the sheet guides easily rearwards and the cut portions divide naturally to facilitate the succeeding cut. As shown in Figure 2 one portion of the sheet glides easily over the cam 9, and as seen in Figure 3 the other cut portion slides in under the cam 11. Inasmuch as both cams are offset from the cutting line, buckling or crimping of the cut portions of the sheet is prevented.

Both the blade 6 as well as the blade 12 are easily removable for sharpening.

I claim:—

A pair of shears comprising a relatively stationary base member, a cutting blade removably secured thereto, said member being provided with an upwardly facing material guiding surface offset to one side of the cutting edge of said blade, a handle and a backing member integral with the said base member and provided with a downwardly facing material guiding surface offset to the opposite side of the said cutting edge, a movable cutting blade pivoted on said backing member in a recess therein, said backing member and movable cutting member and movable cutting blade being flush, a handle for operating said movable blade, a double link connection between said handle and said backing member, means for pivoting the movable cutting blade to said last named handle and a pin and slot connection between said backing member and said movable blade for guiding the latter.

Signed at West New Brighton, in the county of Richmond and State of New York, this 23rd day of Sept., 1921.

WILHELM JOHNSEN.